United States Patent
Kane et al.

(10) Patent No.: US 10,613,020 B2
(45) Date of Patent: Apr. 7, 2020

(54) BURR DETECTION SYSTEMS AND METHODS

(71) Applicant: The Boeing Company, Chicago, IL (US)

(72) Inventors: Daniel James Kane, Mercer Island, WA (US); Ricole Allison Johnson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 15/674,432

(22) Filed: Aug. 10, 2017

(65) Prior Publication Data
US 2019/0049362 A1 Feb. 14, 2019

(51) Int. Cl.
| | | |
|---|---|---|
| *G01N 19/08* | (2006.01) | |
| *G01N 3/24* | (2006.01) | |
| *G01N 19/02* | (2006.01) | |
| *G01N 3/06* | (2006.01) | |
| *G01N 3/56* | (2006.01) | |

(52) U.S. Cl.
CPC ............. *G01N 19/08* (2013.01); *G01N 3/066* (2013.01); *G01N 3/24* (2013.01); *G01N 3/56* (2013.01); *G01N 19/02* (2013.01)

(58) Field of Classification Search
CPC .......... G01N 19/02; G01N 19/08; G05B 5/28
See application file for complete search history.

(56) References Cited

U.S. PATENT DOCUMENTS

| | | | |
|---|---|---|---|
| 4,748,672 A | 5/1988 | Nevill et al. | |
| 4,777,769 A | 10/1988 | McLaughlin et al. | |
| 4,894,597 A | 1/1990 | Ohtomi | |
| 4,942,672 A * | 7/1990 | Yoshida | G01B 5/061 33/832 |
| 6,516,655 B1 * | 2/2003 | Adrian | G01N 3/42 73/760 |
| 6,532,840 B2 * | 3/2003 | Hatley | B25J 5/00 356/241.1 |

(Continued)

FOREIGN PATENT DOCUMENTS

| | | |
|---|---|---|
| EP | 2468122 | 6/2012 |
| FR | 2905759 | 3/2008 |

(Continued)

OTHER PUBLICATIONS

"Detecting the Burr", BladeForums, accessible online at <https://www.bladeforums.com/threads/detecting-the-burr.759794/>, Jul. 25, 2010.*

*Primary Examiner* — David A Rogers
(74) *Attorney, Agent, or Firm* — Haynes and Boone, LLP

(57) ABSTRACT

Various techniques are provided for a burr detection system. In a certain example, a burr detection system can include a test piece holder configured to hold a test piece, a robot arm, a test fabric holder disposed on a first end of the robot arm and configured to hold a test fabric, a force sensor coupled to the robot arm and configured to output force data associated with a force required to move the test fabric when the test fabric is contacting the surface of the test piece, and a controller configured to receive the force data and determine based on the force data a possible presence of a burr within an area of the test piece force data. In certain other examples, related methods for detecting burrs are also provided.

20 Claims, 5 Drawing Sheets

(56) References Cited

U.S. PATENT DOCUMENTS

| | | | | |
|---|---|---|---|---|
| 6,557,398 B2* | 5/2003 | Lindmark | ............... | G01N 5/045 100/131 |
| 6,595,075 B1* | 7/2003 | Shien | ............... | H01L 21/67259 206/710 |
| 6,666,066 B1* | 12/2003 | Mollenhauer | .......... | G01N 19/02 73/9 |
| 6,792,820 B2* | 9/2004 | Wentworth | ............... | E03F 3/06 15/104.03 |
| 6,810,744 B2* | 11/2004 | Bueno-Bigue | ........... | G01B 7/34 73/649 |
| 6,860,148 B2* | 3/2005 | Kossuth | ................. | G01N 19/02 73/159 |
| 6,879,404 B2* | 4/2005 | Jagiella | .................. | G01B 7/142 356/241.1 |
| 6,901,797 B2* | 6/2005 | Hyatt | ...................... | G01B 13/10 33/543 |
| 6,907,799 B2* | 6/2005 | Jacobsen | ............... | G01N 29/045 73/865.8 |
| 6,941,826 B2* | 9/2005 | Mitani | .................. | B23K 11/253 219/121.28 |
| 7,023,564 B2* | 4/2006 | Jagiella | ................ | G01N 21/892 356/237.1 |
| 7,077,019 B2* | 7/2006 | Weiss | .................... | B65G 49/061 73/865.8 |
| 7,137,309 B2* | 11/2006 | Weiss | .................... | B65G 49/061 73/865.8 |
| 7,231,839 B2* | 6/2007 | Huber | .................... | B01L 3/0241 417/48 |
| 7,587,952 B2* | 9/2009 | Dale | ........................ | B01L 9/06 422/562 |
| 7,628,075 B2* | 12/2009 | Kennedy | .............. | G01N 29/225 73/628 |
| 7,698,962 B2* | 4/2010 | LeFebvre | ................ | B61F 5/305 73/862.621 |
| 7,765,868 B2* | 8/2010 | Pirsch | ...................... | B01L 1/00 359/398 |
| 7,780,248 B2* | 8/2010 | Granadino | ............ | G01M 3/226 312/1 |
| 7,899,645 B2* | 3/2011 | Qureshi | ................ | B01L 3/0268 702/159 |
| RE42,358 E* | 5/2011 | Tucker | ..................... | F16L 1/26 73/49.5 |
| 8,047,053 B2* | 11/2011 | Call | ........................ | G01N 1/2202 73/28.01 |
| 8,057,756 B2* | 11/2011 | Londo | .................... | B01L 3/0227 422/500 |
| 8,192,698 B2* | 6/2012 | Londo | ................ | G01N 35/0099 422/500 |
| 8,220,347 B2* | 7/2012 | Cox | ..................... | G01N 1/2294 73/863.71 |
| 8,307,724 B1* | 11/2012 | Wichert | .................... | G01N 1/24 73/863 |
| 8,309,036 B2* | 11/2012 | Clark | ........................ | B01L 9/06 422/501 |
| 8,443,653 B2* | 5/2013 | Dellach | ................. | B25J 19/063 73/37 |
| 8,453,507 B2* | 6/2013 | Ellson | .................... | B01L 3/0268 73/596 |
| 8,490,505 B2* | 7/2013 | Lee | ....................... | G01R 31/021 73/865.8 |
| 8,528,427 B2* | 9/2013 | Vrane | ................. | G01N 15/1404 422/63 |
| 8,567,694 B2* | 10/2013 | Herre | .................... | G01M 99/008 239/71 |
| 8,640,558 B2* | 2/2014 | Cabuz | .................... | G01N 21/88 73/865.8 |
| 8,671,785 B2* | 3/2014 | Chen | .................... | G01M 11/088 433/68 |
| 8,726,745 B2* | 5/2014 | Heinze | ................ | G01F 23/2962 422/501 |
| 8,790,593 B2* | 7/2014 | Clark | ........................ | B01L 9/06 422/501 |
| 8,833,178 B2* | 9/2014 | de Boissieu | ............ | G01B 5/28 73/760 |
| 8,855,885 B2* | 10/2014 | Takenaka | ................ | B60T 8/172 701/72 |
| 9,092,034 B2* | 7/2015 | Vrane | ................ | G01N 15/1404 |
| 9,157,848 B2* | 10/2015 | Valencia | .................. | G01B 5/28 |
| 9,194,977 B1* | 11/2015 | Dungan | ................. | G01C 25/00 |
| 9,505,081 B2* | 11/2016 | Nakagawa | ............... | C21D 9/40 |
| 9,541,566 B2* | 1/2017 | Hecht | .................... | G01N 35/02 |
| 9,606,028 B2* | 3/2017 | Detweiller | ............... | G01N 1/14 |
| 9,726,569 B2* | 8/2017 | Koyanagi | ............ | G01N 23/025 |
| 9,910,054 B2* | 3/2018 | Johns | .................... | B01D 21/262 |
| 9,939,807 B2* | 4/2018 | Walker, Jr. | ......... | G05B 19/4097 |
| 9,952,044 B2* | 4/2018 | Gatton | ..................... | G01B 3/30 |
| 10,082,518 B2* | 9/2018 | Davis | ................. | G01N 35/1011 |
| 10,151,602 B2* | 12/2018 | Park | ..................... | G01C 25/005 |
| 10,159,971 B2* | 12/2018 | Amini | ..................... | G01N 1/08 |
| 10,175,198 B2* | 1/2019 | Briglin | .................. | G01N 27/64 |

FOREIGN PATENT DOCUMENTS

| | | | |
|---|---|---|---|
| JP | S-63174857 A | * | 7/1988 |
| JP | H02 257039 | | 10/1990 |
| JP | 06066536 A | * | 3/1994 |
| WO | WO 2010/103102 | | 9/2010 |

* cited by examiner

US 10,613,020 B2

BURR DETECTION SYSTEMS AND METHODS

TECHNICAL FIELD

The disclosure relates generally to component manufacturing and specifically to detecting burrs on such components.

BACKGROUND

It is desirable to identify burrs on vehicle components, especially aerodynamic components (e.g., surfaces that are exposed to airflow) as such burrs can lead to suboptimal operation of the vehicle.

SUMMARY

Systems and methods are disclosed for burr detection. In a certain example, a burr detection system is disclosed and includes a test piece holder configured to hold a test piece, a robot arm, a test fabric holder disposed on a first end of the robot arm and configured to hold a test fabric, where the robot arm is configured to move the test fabric when the test fabric is contacting a surface of the test piece, a force sensor coupled to the robot arm and configured to output force data associated with a force required to move the test fabric when the test fabric is contacting the surface of the test piece, and a controller configured to receive the force data and determine based on the force data a possible presence of a burr within an area of the test piece force data.

In certain other examples, a method is disclosed and includes holding a test fabric, moving the test fabric when the test fabric is contacting a surface of a test piece, determining a force required to move the test fabric when the test fabric is contacting the surface of the test piece, and determining a possible presence of a burr within an area of the test piece based on the determining the force required to move the test fabric.

The scope of the disclosure is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of a burr detection system are disclosed herein along with related methods. As an illustrative example, a burr detection system includes a test piece holder configured to hold a test piece, a robot arm, a test fabric holder disposed on a first end of the robot arm and configured to hold a test fabric, and a force sensor configured to detect a force required to move the test fabric when the test fabric is contacting the surface of the test piece. Data from the burr detection system (e.g., data from the force sensor) can be communicated to a controller. The controller can detect the presence of a burr on the test piece from the data.

The systems and techniques disclosed herein allow for more accurate and efficient identification of burrs on a component. In certain situations, the presence of such burrs can lead to inefficient operation of the vehicle. For example, burrs that are present on aerodynamic surfaces of the vehicle (e.g., surfaces of components that are exposed to airflow such as wings, fuselages, tails, spoilers, flaps, stabilizers, nacelles, and other such components) can disrupt airflow and alter the aerodynamic performance of the vehicle. In certain examples, air can flow over a smooth aerodynamic surface as laminar flow. However, the presence of a burr on the aerodynamic surface can lead to laminar flow becoming turbulent flow. Turbulent flow decreases aerodynamic performance. However, such burrs can often be too small to be visible to the human eye. Accordingly, accurate identification of burrs is desirable.

Currently, identification of burrs on such vehicle components is a difficult and time consuming process. Existing systems to identify such burrs can only detect burrs within a small area and thus are not practical to be used on an entire vehicle component (e.g., on aircraft components with aerodynamic surfaces such as an engine nacelle or wing of an aircraft). The systems and techniques described herein allow for accurate and quick detection of burrs on such components.

Figure 1:
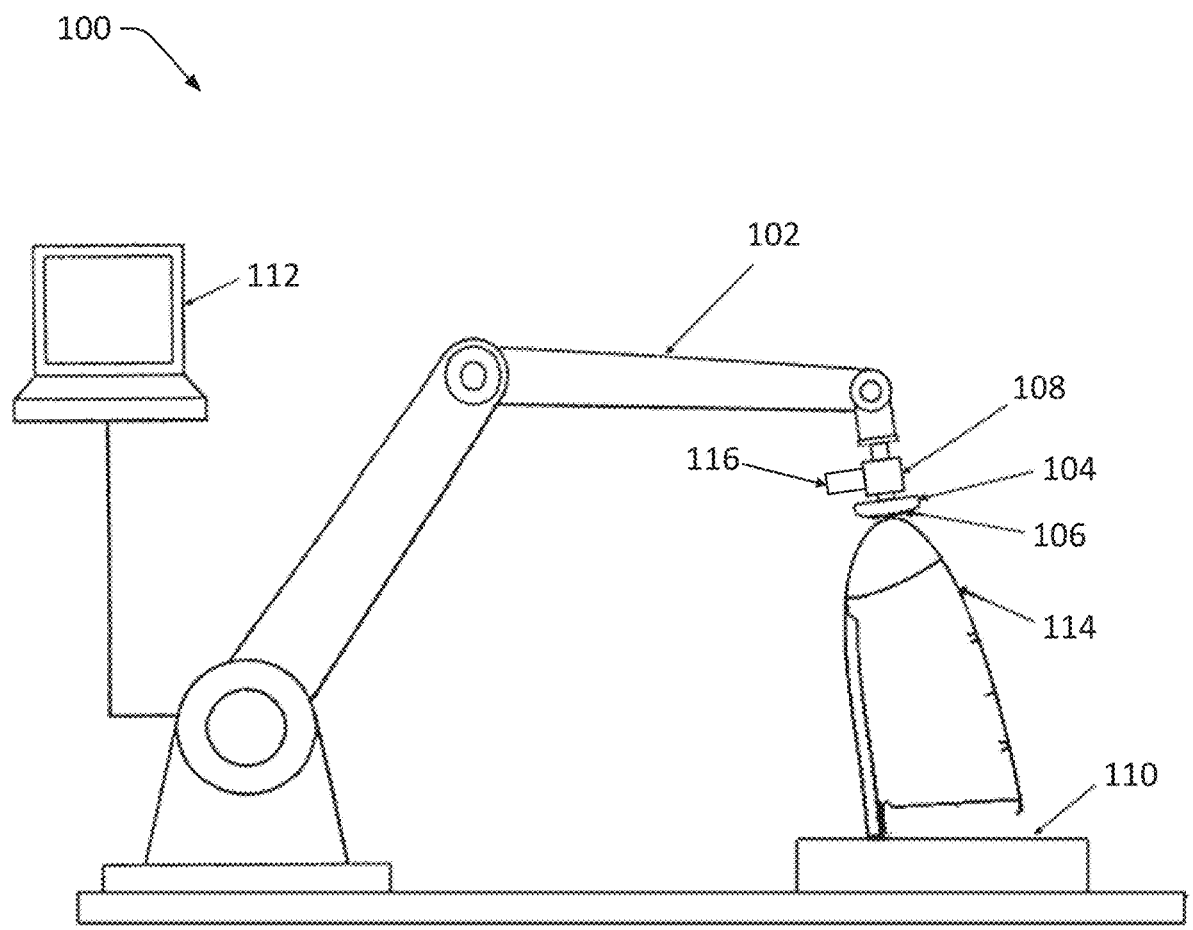
FIG. 1 illustrates a burr detection system in accordance with an example of the disclosure.

FIG. 1 illustrates a burr detection system in accordance with an example of the disclosure. The burr detection system 100 of FIG. 1 includes a robot arm 102, a test fabric holder 104, a test fabric 106, a force sensor 108, a test piece holder 110, a controller 112, a test piece 114, and a secondary sensor 116.

The robot arm 102 can be a robot arm configured to robotically move the test fabric holder 104 and the test fabric 106 over a surface of the test piece 114. The robot arm 102 can include one or more links and each such link can move in relation to and/or independently of one or more other links. As such, each of the links can rotate, translate, and/or otherwise move to perform one or more tasks. In certain examples, the links can be configured to allow the robot arm 102 to move in one or more degrees of freedoms. For example, each link of the robot arm 102 and/or the robot arm 102 in its entirety can be configured to move in one, two, three, four, five, or six degrees of freedom.

The test fabric holder 104 can be disposed on a first end of the robot arm 102 and can be configured to hold the test fabric 106. The test fabric 106 can be disposed on the test fabric holder 104 through mechanical fastening (e.g., through clips, screws, and/or other fasteners), through adhesives (e.g., glue), and/or through other techniques for attaching the test fabric 106 to the test fabric holder 104.

The test fabric 106 can be any sort of fabric that can be configured to detect the presence of burrs. In certain examples, the test fabric 106 can be cotton, wool, synthetic, microfiber, composite, and/or other types of fabrics. The test fabric 106 is composed of a plurality of fibers and can be configured so that the thickness of the largest fiber is less than or equal to twice that of the minimum burr height that the burr detection system 100 is configured to detect. E.g., if the smallest burr that the burr detection system 100 is configured to detect has a height of 0.0030 inches, than the thickness of the largest fiber should be no more than 0.0060 inches.

The robot arm 102 can be configured to move the test fabric holder 104 and, thus, the test fabric 106 at least when the test fabric 106 is contacting a surface of the test piece 114. As the robot arm 102 moves the test fabric 106 along the surface of the test piece 114 held by the test piece holder 110, fibers of the test fabric 106 can catch on burrs present on the test piece 114. As the fibers catch the burrs, the force required to move the test fabric 106 can change. The force sensor 108 is coupled to the robot arm 102 and is configured to detect such changes in force required to move the test fabric 106. The force sensor 108 can detect the force required to move the robot arm 102, the test fabric holder 104, and/or the test fabric 106. In certain examples, the force sensor 108 can be disposed near the test fabric holder 104 and/or the test fabric 106, but other examples can include the force sensor 108 disposed and/or coupled to other portions of the robot arm 102.

Data from the force sensor 108 can be communicated to the controller 112. The controller 112 can include, for example, a single-core or multi-core processor or microprocessor, a microcontroller, a logic device, a signal processing device, non-transitory memory for storing executable instructions (e.g., software, firmware, or other instructions), and/or any elements to perform any of the various operations described herein. In various examples, the controller 112 and/or its associated operations can be implemented as a single device or multiple devices (e.g., communicatively linked through wired or wireless connections) to collectively constitute the controller 112. Additionally, the controller 112 can be communicatively linked (e.g., communicatively linked through wired or wireless connections) to the robot arm 102, the force sensor 108, the secondary sensor 116, and/or other components of the burr detection system 100 to receive signals from such components and/or provide control instructions to such components.

The controller 112 can include one or more memory components or devices to store data and information. The memory can include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 112 can be adapted to execute instructions stored within the memory to perform various methods and processes described herein, including implementation and execution of control algorithms responsive to sensor and/or operator inputs.

The controller 112 can be configured to detect the presence of burrs on the test piece 114 from, at least, the data from the force sensor 108. When the test fabric 106 moves over a burr, one or more fibers of the test fabric 106 can snag the burr. The snagging of the burr can cause an increase in the amount of force required to move the test fabric 106. The controller 112 can determine, from data from the force sensor 108, the increase in force. If the increase in force exceeds a threshold increase, then the controller 112 can determine that the test fabric 106 is passing over a burr. In certain examples, the threshold increase can be a magnitude increase (e.g., an increase of more than 1 Newton, 2 Newtons, or 2 Newtons or more of force), a percentage increase (e.g., an increase of at least 25%, at least 30%, at least 50%, or more than 50% of force over a baseline or typical force), and/or another type of increase and/or a combination of increases (e.g., both magnitude and percentage) over a baseline or typical force. As such, if 5 Newtons of force is typically required or is the average force required to move the test fabric 106 on the test piece 114, and a 50% increase over the typical or average force can indicate the presence of a burr within the surface area covered by the test fabric 106 at the time of the force increase, the controller can determine a possible presence of a burr within the area if data from the force sensor 108 indicates that 7.5 Newtons or higher of force is required to move the test fabric 106 on the test piece 114.

The test piece holder 110 is configured to hold the test piece 114. In certain examples, the test piece holder 110 can be configured to hold the test piece so that moving the test fabric 106 over the test piece 114 does not result in substantial movement of the test piece 114. In certain such examples, the test piece 114 can, before a burr detection sequence is performed, be coupled to the test piece holder 110.

After the appropriate burr detection sequence has been performed, the test piece 114 can then be decoupled from the test piece holder 110 (e.g., to be used in manufacture of the vehicle and/or to be reworked).

The secondary sensor 116 can be an additional sensor for detection of burrs on the test piece 114. For example, the secondary sensor 116 can be a visual, radar, ultrasonic, and/or laser sensor and/or surface scanner that can scan an area. In certain examples, the secondary sensor 116 can be used to detect burrs within a targeted area. Certain such examples can detect the presence of burrs within an area covered by the test fabric 106 (e.g., the area that the test fabric 106 covers when an increase in force required to move the test fabric 106 is detected), and utilize the secondary sensor 116 to, for example, scan the area to further detect and/or confirm the presence of the burr. As such, such systems can use the test fabric 106 to determine a possible presence of a burr within an area and then use the secondary sensor 116 to confirm the presence of the burr within the area.

While FIG. 1 illustrates the burr detection system 100 that can perform the techniques described herein, other examples can perform the burr detection techniques with other systems (e.g., other automatically operated robotic systems, with a user operated system, and/or by hand with one or more gloves constructed of test fabric).

Figure 2:
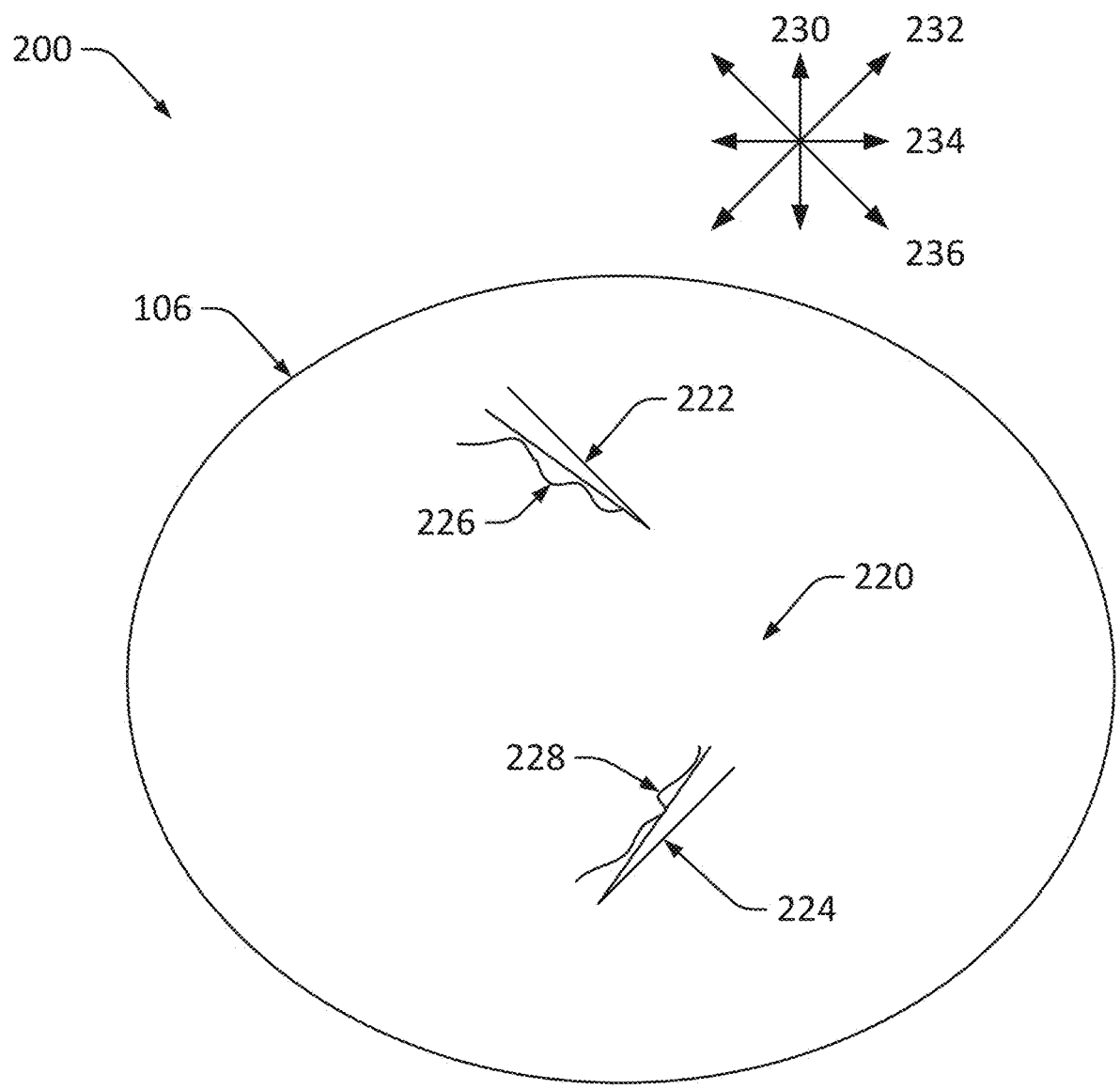
FIG. 2 illustrates an example of using the burr detection system in accordance with an example of the disclosure.

FIG. 2 illustrates an example of using the burr detection system in accordance with an example of the disclosure. Example 200 of FIG. 2 illustrates a test fabric 106 contacting a test piece through an area 220 that contains burrs 222 and 224.

The test fabric 106 can be configured to move in one or more directions. For example, the test fabric 106 can translate in directions 230, 232, 234, and/or 236. Certain other examples can have the test fabric 106 rotate in one or more directions. In certain such examples, the robot arm 102 can translate and/or rotate the test fabric 106 in a plurality of directions in order to increase the likelihood of detecting the burr. As such, the robot arm 102 can both translate and rotate the test fabric 106 in one or more directions.

When the test fabric 106 is translated and/or rotated in a direction, fibers of the test fabric 106 can catch on any burrs present on the test piece 114. When the fiber catches on the burr, the force required to move the test fabric 106 over the test piece 114 can increase. If the increase in force exceeds a threshold increase, the controller 112 can then determine a possible presence of a burr within the area 220 covered by the test fabric 106.

In FIG. 2, the area 220 can include burrs 222 and 224. As the test fabric 106 moves over the area 220 of the test piece 114, fibers of the test fabric 106 can catch on the burrs 222 and/or 224. Catching the burrs 222 and/or 224 with the fibers of the test fabric 106 can lead to an increase in the force required to move the test fabric 106 on the surface of the test piece 114 and allow for the controller 112 to determine a possible presence of the burrs 222 and/or 224 within the area 220. Additionally, fibers 226 and 228 can catch on the burrs 222 and 224, respectively, and be left behind close to the position of the burrs. Such left behind fibers 226 and 228 can allow for the burrs to be more easily identified through visual scanning. As such, in certain examples, the fibers of the test fabric 106 can be a color different from the color of the test piece 114 to allow for easier identification of the burrs. In certain examples, the secondary sensor 116 can then further inspect the area.

In other examples, the burr detection system 100 can be configured to determine the presence of the burr from just passing the test fabric 106 over the area of the test piece 114. In certain such examples, the burr detection system 100 can determine that the area covered by the test piece 114 should be reworked (e.g., smoothed out) and/or refinished when the presence of the burr is detected to remove such burr.

The test fabric 106 can be moved in a plurality of directions (e.g., by the robot arm 102) over the area 220. For example, the test fabric 106 can be moved in two or more of directions 230, 232, 234, and 236 and/or rotated in addition to being translated. Certain examples can move the test fabric 106 in any combination of translational and/or rotational directions. Burrs present on the test piece 114 can be oriented so that the each burr will catch fiber(s) only when the test fabric 106 is moved over the burr in certain directions. Moving the test fabric 106 in a plurality of directions can allow for fibers of the test fabric 106 to catch on more burrs present on the test piece 114. As illustrated in FIG. 2, burrs 222 and 224 are in different orientations (e.g., the burr 222 is in a first orientation and the burr 224 is in a second orientation). The test fabric 106 can catch on the burr 222 when moving in direction 232 and can catch on the burr 224 when moving in direction 236. Accordingly, moving the test fabric 106 in directions 230 and/or 234 might lead to the test fabric 106 not catching on burrs 222 and/or 224 and, thus, moving in a plurality of directions can lead to detection of more burrs and/or lead to increased likelihood of detection of burrs.

In certain other such examples, the robot arm 102, the test fabric holder 104, and/or the test fabric 106 can include one or more force sensors (e.g., force sensors additional to the force sensor 108) to determine local resistance to movement to the test fabric 106. For example, such sensors can detect force pulling the test fabric 106 against its direction of movement (e.g., resistance to movement of the test fabric 106). In an exemplary system, such sensors can be disposed on the test fabric holder 104 and be coupled to at least a portion of the test fabric 106 when the test fabric 106 is mounted on the test fabric holder 104. In systems with a plurality of such sensors, the sensors can form a grid and each sensor can be used to detect localized resistance force for a portion of the test fabric 106. If such force is higher than a threshold force, then that portion of the test piece 114 covered by the test fabric 106 (e.g., the area covered by the portion of the test fabric 106 that the sensor is configured to detect the movement force of) can include one or more burrs. Such a system can allow for a larger test fabric 106 while reducing and/or eliminating the need for secondary review of the area covered by the test fabric 106 as well as increasing the precision of determinations of the location of burrs.

Figure 3:
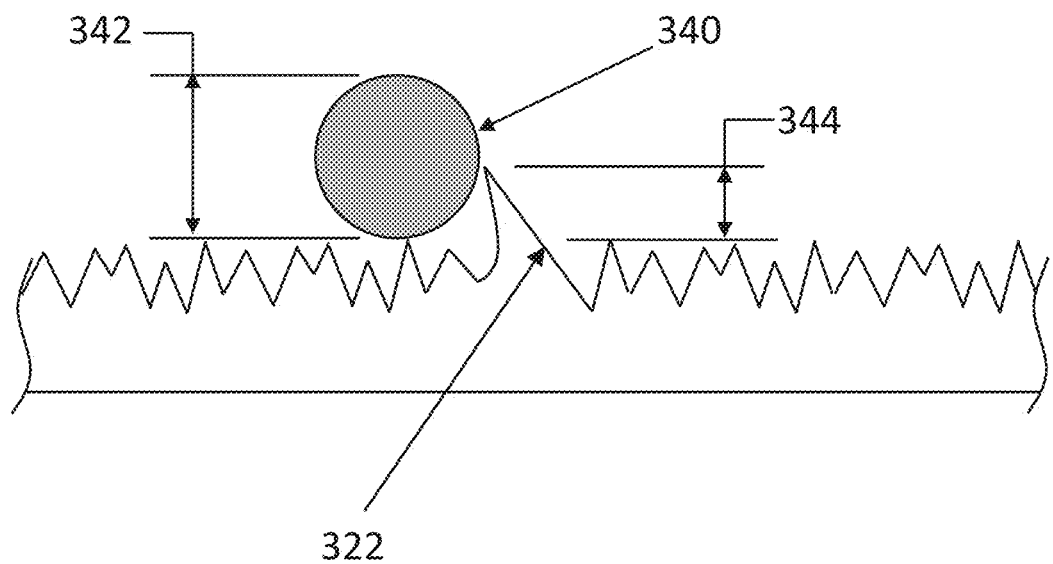
FIG. 3 illustrates an example of burr detection in accordance with an example of the disclosure.

FIG. 3 illustrates an example of burr detection in accordance with an example of the disclosure. FIG. 3 illustrates a fiber 340 of a test fabric contacting a burr 322. Fiber 340 can be a circular shaped fiber. As shown in FIG. 3, fiber 340 has a thickness 342 and the burr 322 has a height 344. The thickness 342 is twice or less than twice that of height 344. Thus, fiber 340 can catch on burr 322 and lead to increased resistance to movement of the test fabric and/or can snag on the burr 322 and be left behind on the test piece as a visual indicator of the location of the burr 322.

In certain examples, the height 344 can be a minimum height of a burr that the test fabric 106 is configured to detect. To consistently detect burrs of height 344 or greater, the fibers of the test fabric 106 can be a maximum thickness that is twice that of height 344. Thus, the thickness 342 of fiber 340 is at most twice that of height 344.

The test piece surface also includes a plurality of other microscopic protrusions, but such protrusions are of a height less than half that of the thickness 342 of the fiber 340 and so does not catch the fiber 340. Additionally, such protrusions can be of a size that does not cause a decrease in aerodynamic performance of the test piece. Accordingly, the fiber 340 of the test fabric can be sized to not detect such protrusions to reduce the amount of false positives detected by the burr detection system 100.

Figure 4:
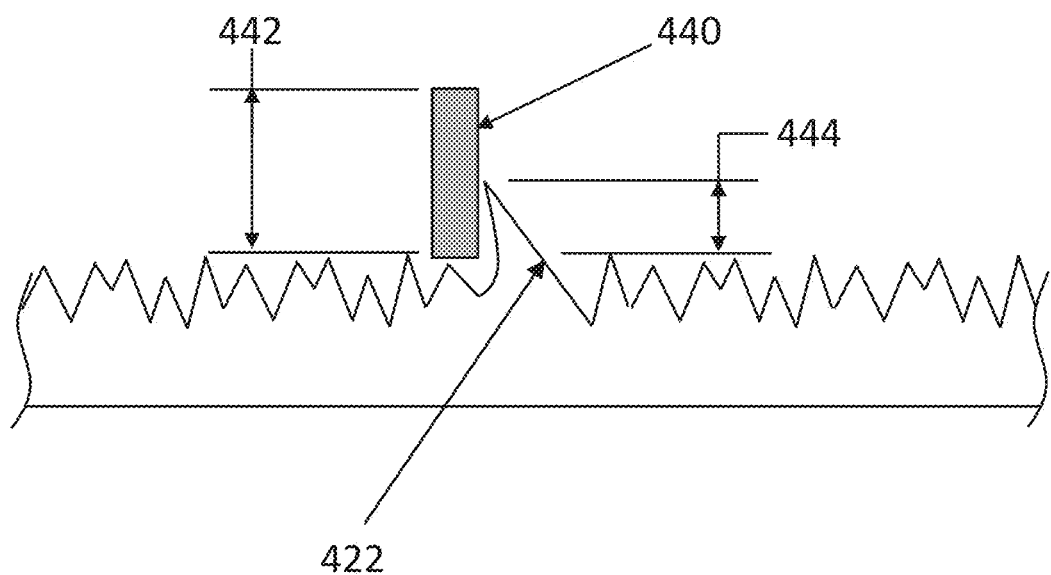
FIG. 4 illustrates a further example burr detection in accordance with an example of the disclosure.

FIG. 4 illustrates a further example burr detection in accordance with an example of the disclosure. FIG. 4 illustrates a fiber 440 of a test fabric contacting a burr 422. Fiber 440 can be a rectangular shaped fiber. As shown in FIG. 4, fiber 440 has a thickness 442 that is twice or less than twice height 444 of the burr 422. Thus, fiber 440 can catch on burr 422 and lead to increased resistance to movement of the test fabric and/or can snag on the burr 422 and be left behind on the test piece as a visual indicator of the location of the burr 422. Though FIGS. 3 and 4 are directed to circular and rectangular shaped fibers of test fabrics, other examples can include fibers of other shapes or of irregular shapes (e.g., the shape is different at one portion of the fiber as compared to another portion of the fiber).

Figure 5:
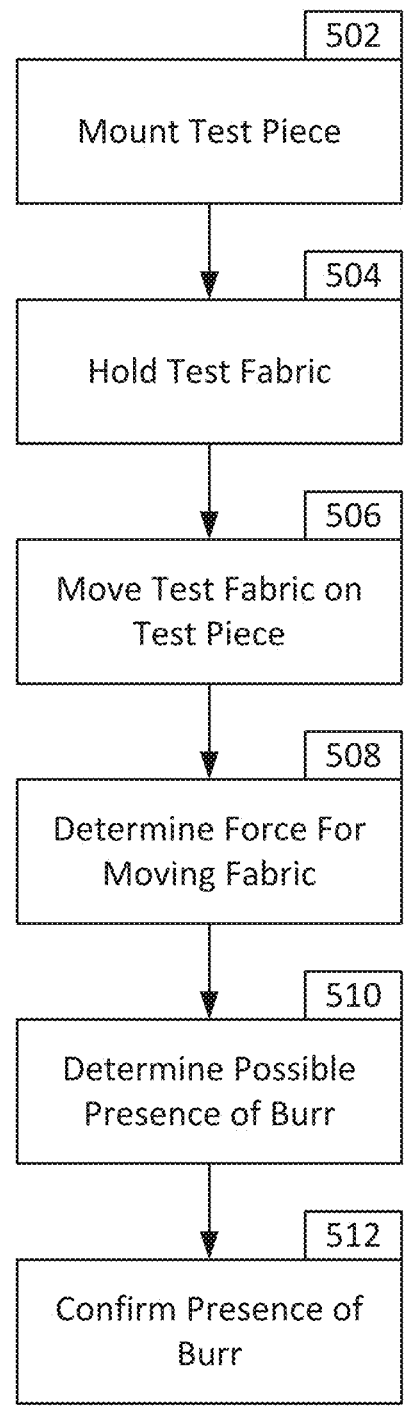
FIG. 5 is a flowchart detailing a method of burr detection in accordance with an example of the disclosure.

FIG. 5 is a flowchart detailing a method of burr detection in accordance with an example of the disclosure. In block 502, a test piece 114 is mounted on a test piece holder 110. The test piece 114 can be any manufactured component, such as a vehicle component that includes an aerodynamic surface.

In block 504, the test fabric 106 is held by the test fabric holder 104. In certain examples, the test fabric 106 can be coupled to the test fabric holder 104 in block 504, but other examples can include the test fabric 106 having been previously coupled to the test fabric holder 104 prior to block 504.

In block 506, the robot arm 102 can move so that the test fabric 106 contacts the test piece 114. In certain examples, the robot arm 102 can detect when the test fabric 106 has contacted the test piece 114. The robot arm 102 can then move the test fabric 106 on the test piece 114.

In block 508, the force required to move the test fabric 106 on the test piece 114 is determined by the force sensor 108 and outputted to the controller 112. The controller 112 can then determine the force required to move the test fabric 106 on the portion of the test piece 114 via, for example, the force sensor 108 as well as one or more other sensors (e.g., sensors coupled to the test fabric as described herein).

In certain examples, the controller 112 can be programmed, can be inputted, or can be configured to first determine a baseline or typical force to move the test fabric 106 on the test piece 114 (e.g., force required to move the test fabric 106 on the test piece 114 when no burrs are present). Such a determination can be made by, for example, moving the test fabric 106 on a baseline test piece confirmed to not include burrs. Such baseline test pieces can include a shape similar to the shape of production components to be tested, or can just include a similar surface (e.g., the baseline is made of the same material and/or finish as that of production components).

In block 510, the possible presence of a burr can be determined from the force required to move the test fabric 106. In certain examples, the possible presence of the burr can be determined from an increase in force required to move the test fabric 106. Additionally or alternatively, the possible presence of the burr can be determined from fibers caught on such burrs. In certain examples, the presence of the burr can be determined directly in block 510 from force data, but other examples can proceed to block 512 to confirm the presence of the burr.

In block 512, the presence of the burr can be confirmed. For example, one or more secondary sensors 116 can scan an area identified to possibly include a burr. Additionally, other examples can include visual and/or manual (hand) inspections. Hand inspections can be conducted with one or more gloves constructed of test fabric, moving and/or rotating in a plurality of directions in order to increase the likelihood of detecting the burr. After the burr has been confirmed, the test piece 114 can then be reworked and/or refinished to remove such burrs.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system comprising:
    a test piece holder configured to hold a test piece;
    a robot arm;
    a test fabric holder disposed on a first end of the robot arm and configured to hold a test fabric, wherein the robot arm is configured to move the test fabric when the test fabric is contacting a surface of the test piece;
    a plurality of force sensors arranged in a grid and coupled to the robot arm, wherein each force sensor of the plurality of force sensors is configured to output force data associated with a force required to move a portion of the test fabric associated with the force sensor when the test fabric is contacting the surface of the test piece;
    a surface scanner; and
    a controller configured to:
        receive the force data and determine, based on the force data, a possible presence of a burr within an area of the test piece;
        determine a location of the area on the test piece; and
        scan the location of the area with the surface scanner to confirm the possible presence of the burr.

2. The system of claim 1, wherein determining the possible presence of the burr within the area of the test piece is based on the force required to move the test fabric within the area being a threshold percentage higher than a typical force required to move the test fabric on the test piece.

3. The system of claim 2, wherein the threshold percentage is at least thirty percent higher than the typical force, and wherein the typical force is an average force required to move the test fabric.

4. The system of claim 1 wherein the controller is further configured to:
    determine one of the plurality of force sensors detects that the force required to move the portion of the test fabric indicates the possible presence of the burr within the area of the test piece covered by the portion of the test fabric; and
    cause the surface scanner to scan the area of the test piece covered by the portion of the test fabric associated with the one of the plurality of force sensors to confirm the possible presence of the burr.

5. The system of claim 1, further comprising the test fabric.

6. The system of claim 5, wherein the burr is at least a minimum height and wherein the test fabric comprises fibers with a maximum thickness twice that of the minimum height.

7. The system of claim 1, wherein the robot arm is configured to move in at least a first direction when the test fabric is contacting the surface of the test piece to determine the possible presence of the burr oriented in a first orientation.

8. The system of claim 1, wherein the test piece is an aircraft component and the test piece holder is configured to hold the aircraft component.

9. The system of claim 8, wherein the surface of the test piece is an aerodynamic surface of the aircraft component.

10. A method comprising:
    holding a test fabric;
    moving the test fabric when the test fabric is contacting a surface of a test piece;
    determining a force required to move the test fabric when the test fabric is contacting the surface of the test piece, wherein determining the force comprises determining that one of a plurality of force sensors arranged in a grid, each force sensor being associated with a portion of the test fabric, detects a force required to move the portion of the test fabric;
    determining a possible presence of a burr within an area of the test piece covered by the portion of the test fabric based on the force required to move the portion of the test fabric;
    storing a location of the area within a database; and
    scanning, with a surface scanner, the area of the test piece covered by the portion of the test fabric associated with the one of the plurality of force sensors to confirm the possible presence of the burr.

11. The method of claim 10, wherein the determining the possible presence of the burr within the area of the test piece comprises determining that the force required to move the test fabric within the area is a threshold percentage higher than a typical force required to move the test fabric on the test piece.

12. The method of claim 11, wherein the threshold percentage is at least thirty percent higher than the typical force, and wherein the typical force is an average force required to move the test fabric.

13. The method of claim 10, wherein the burr is at least a minimum height and wherein the test fabric comprises fibers with a maximum thickness twice that of the minimum height.

14. The method of claim 10, wherein the moving the test fabric comprises moving in at least a first direction when the test fabric is contacting the surface of the test piece to determine the possible presence of the burr oriented in a first orientation.

15. The method of claim 14, wherein the moving the test fabric further comprises moving in a second direction when the test fabric is contacting the surface of the test piece to determine the possible presence of the burr oriented in a second orientation.

16. The method of claim 10, wherein the test piece is an aircraft component and further comprising holding the aircraft component.

17. The method of claim 16, wherein the surface of the test piece is an aerodynamic surface of the aircraft component.

18. A non-transitory memory configured to store instructions to cause a system to perform the method of claim 10, the system further comprising:
   a test piece holder configured to hold the test piece;
   a robot arm;
   a test fabric holder disposed on a first end of the robot arm and configured to hold the test fabric, wherein the robot arm is configured to move the test fabric when the test fabric is contacting the surface of the test piece;
   the surface scanner; and
   the plurality of force sensors arranged in the grid and coupled to the robot arm, wherein each force sensor of the plurality of force sensors is configured to output force data associated with the force required to move the portion of the test fabric associated with the force sensor when the test fabric is contacting the surface of the test piece.

19. The non-transitory memory of claim 18, wherein the test piece is an aircraft component and the surface of the test piece is an aerodynamic surface of the aircraft component.

20. The non-transitory memory of claim 18, wherein the instructions cause the robot arm to move the test fabric in a first direction and a second direction when the test fabric is contacting the surface of the test piece to determine the possible presence of the burr oriented in a first orientation and a second orientation, respectively.

* * * * *